(12) United States Patent
Saxena et al.

(10) Patent No.: US 8,835,583 B2
(45) Date of Patent: *Sep. 16, 2014

(54) FREE RADICAL POLYMERIZABLE COMPOSITIONS COMPRISING IONIC SILICONES

(71) Applicant: Momentive Performance Materials Inc., Albany, NY (US)

(72) Inventors: Anubhav Saxena, Bangalore (IN); Sandeep Naik, Mumbai (IN); Pranav Ramchandra Joshi, Bangalore (IN); Alok Sarkar, Malda (IN); Monjit Phukan, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,131

(22) Filed: Dec. 20, 2012

(65) Prior Publication Data

US 2013/0172427 A1   Jul. 4, 2013

Related U.S. Application Data

(60) Provisional application No. 61/582,925, filed on Jan. 4, 2012.

(51) Int. Cl.

| | | |
|---|---|---|
| *C08G 77/22* | (2006.01) | |
| *C08G 77/382* | (2006.01) | |
| *C09J 183/08* | (2006.01) | |
| *C08G 77/28* | (2006.01) | |
| *C08G 77/38* | (2006.01) | |
| *C09D 183/08* | (2006.01) | |
| *C08L 83/08* | (2006.01) | |
| *C08G 77/26* | (2006.01) | |
| *C08G 77/00* | (2006.01) | |

(52) U.S. Cl.
CPC ............... *C08G 77/28* (2013.01); *C09J 183/08* (2013.01); *C08G 77/26* (2013.01); *C08G 77/38* (2013.01); *C09D 183/08* (2013.01); *C08G 77/70* (2013.01); *C08L 83/08* (2013.01); *C08G 77/22* (2013.01)

USPC .......... 526/279; 522/99; 524/588; 526/303.1; 526/317.1; 526/319; 526/320; 526/323.1; 528/26; 528/27; 528/28; 528/30; 528/32; 528/38

(58) Field of Classification Search
None
See application file for complete search history.

(56) References Cited

U.S. PATENT DOCUMENTS

| | | | |
|---|---|---|---|
| 2,968,643 A | | 1/1961 | Bailey |
| 4,495,340 A | | 1/1985 | Blizzard |
| 4,523,002 A | | 6/1985 | Campbell et al. |
| 4,525,567 A | | 6/1985 | Campbell et al. |
| 8,080,625 B2 * | | 12/2011 | Herzig et al. .................... 528/28 |
| 2004/0062738 A1 * | | 4/2004 | Chopra et al. ............. 424/70.12 |
| 2008/0293878 A1 * | | 11/2008 | Funk et al. .................... 524/588 |
| 2013/0171265 A1 * | | 7/2013 | Saxena et al. ................. 424/618 |
| 2013/0172193 A1 * | | 7/2013 | Saxena et al. ................. 504/360 |
| 2013/0172419 A1 * | | 7/2013 | Saxena et al. ................. 514/570 |

FOREIGN PATENT DOCUMENTS

| | | | |
|---|---|---|---|
| DE | 10 2008 044410 A1 | | 6/2010 |
| EP | 0581296 A2 | | 7/1993 |
| JP | 6-116350 | * | 4/1994 |
| JP | 6247827 A | | 9/1994 |
| JP | 6247835 A | | 9/1994 |
| WO | 2006065467 A2 | | 6/2006 |
| WO | 2009/111122 A2 | | 9/2009 |

OTHER PUBLICATIONS

Machine-generated translation of JP 6-116350 into English (no date).*
International Search Report and Written Opinion dated Oct. 21, 2013.

\* cited by examiner

*Primary Examiner* — Marc Zimmer
(74) *Attorney, Agent, or Firm* — Dominick G. Vicari; Joseph S. Ostroff

(57) ABSTRACT

A composition including an actinic radiation or thermally curable polyorganosiloxane ionomer having one or more reactive groups, for example, vinyl, acrylate, epoxy groups.

43 Claims, 1 Drawing Sheet

FREE RADICAL POLYMERIZABLE COMPOSITIONS COMPRISING IONIC SILICONES

CROSS REFERENCE TO RELATED APPLICATIONS

The present application claims priority to U.S. Provisional Application No. 61/582,925 filed Jan. 4, 2012 to which priority is claimed and which is herein incorporated by reference

TECHNICAL FIELD

The present invention relates to free radical polymerizable compositions and more particularly to those compositions containing ionic silicones.

BACKGROUND

Various types of sulfonated or ionically cross-linked siloxane polymers are known in the art.

U.S. Pat. No. 2,968,643 describes the sulfo-arylalkyl siloxanes, their salts and a process for the preparation.

JP patents 6,247,827 and JP 6,247,835 disclose a process for preparing sulfonate functionalized silicones and their use in personal care application.

U.S. Pat. Nos. 4,525,567 and 4,523,002 describe polyorganosiloxane functionalized with zwitterionic sulfonate groups and a method for of their preparation.

WO 2006065467 discloses sulfonate-based ionic silicones and methods for making them via the reaction of an aminopolyorganosiloxanes with sulfonate containing acid anhydride.

EP581296 A2 discloses polyether functionalized sulfonated-polyorganosiloxanes and a method of preparation via hydrosilylation of a hydride-containing polyorganosiloxane with allyl-polyether and p-chloromethylstyrene followed by substitution of the chloro-group in presence of aqueous lithium sulfite solution.

However, the above mentioned methods do not disclose the polyorganosiloxane ionomers bearing reactive functional groups such -silicon-hydride, -vinyl, -acryl, -epoxy and -alkoxysilane as part of the polymer chain.

The present invention describes polyorganosiloxane ionomers bearing vinyl, acryl and epoxy groups as part of the ionomer chain, on account of which the polyorganosiloxane ionomers are rendered curable via free-radical polymerization to yield elastomeric compositions such as, clear elastomeric films, topcoats, hydrogels, and polymer emulsions. The presence of ionic groups imparts differentiating properties to the elastomer compositions thereby making them useful in applications such as healthcare, personal care, automotive, coatings, adhesives, sealants, electrical and electronics, household applications, agriculture, oil and gas, textiles, sporting goods and household articles.

SUMMARY

A composition is provided herein which comprises a thermal or actinic radiation curable polyorganosiloxane ionomer. The polyorganosiloxane ionomer preferably includes one or more reactive groups selected from the group consisting of unsaturated reactive groups such as vinyl, acryl as well as epoxy groups as part of the polymer chain and is depicted by the following general formula (I):

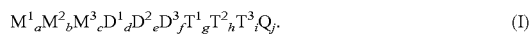

wherein:

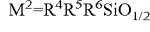

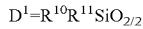

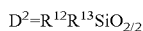

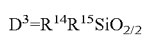

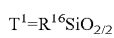

$R^1, R^2, R^5, R^6, R^8, R^9, R^{11}, R^{13}, R^{15}$, are aliphatic, aromatic or fluoro monovalent hydrocarbons having from 1 to 60 carbon atoms, $R^3, R^{10}, R^{16}$ can be independently chosen from glycolide $\{-C(O)CH_2O-\}$, lactide $\{-C(O)CH(CH_3)O-\}$, butyrolactide $\{-C(O)CH_2CH_2CH_2O-\}$ and caprolactide $\{-C(O)CH_2CH_2CH_2CH_2CH_2O-\}$ radicals or hydrocarbon radical defined by $R^1$, $R^4, R^{12}, R^{17}$ are monovalent radical-bearing ion-pairs having the formula (II) or zwitterions having formula (III), wherein formula (II) is as follows,

where A is a spacing group having at least one spacing atoms selected from a divalent hydrocarbon or hydrocarbonoxy group, I is an ionic group selected from sulfonate $-SO_3^-$, sulfate $-OSO_3^-$, carboxylate $-COO^-$, phosphonate $-PO_3^{2-}$ and phosphate $-OPO_3^{2-}$ groups, M is hydrogen or a cation independently selected from alkali metals, alkaline earth metals, transition metals, rare earth metals, metals, metal complexes, quaternary ammonium and phosphonium groups, hydrocarbon cations, alkyl cations, organic cations, and cationic polymers. The zwitterions have the formula (III):

where R' is a divalent hydrocarbon radical containing from 1 to about 60 carbon atoms, R" is monovalent hydrocarbon radical containing from 1 to about 60 carbon atoms, R''' is divalent hydrocarbon radical containing from 2 to about 20 carbon atoms, specifically from 2 to about 8 carbon atoms and more specifically from 2 to about 4 carbon atoms; and, I is an ionic group selected from sulfonate $-SO_3^-$, sulfate $-OSO_3^-$, carboxylate $-COO^-$, phosphonate $-PO_3^{2-}$ and phosphate $-OPO_3^{2-}$ groups, where $R^7, R^{14}, R^{18}$ are independently selected from, unsaturated monovalent radicals or epoxy group containing radicals, where subscripts n and y are independently selected from 1 to 6 and x is a product of n and y, and the subscript a, b, c, d, e, f, g, h, i, j are zero or positive subject to the following limitations: the sum a+b+c+d+e+f+g+h+i+j is greater than or equal to 2 or less than or equal to 6000, the sum b+e+h is greater than zero and the sum c+f+i is greater than zero.

DETAILED DESCRIPTION OF PREFERRED EMBODIMENT(S)

Figure 1:
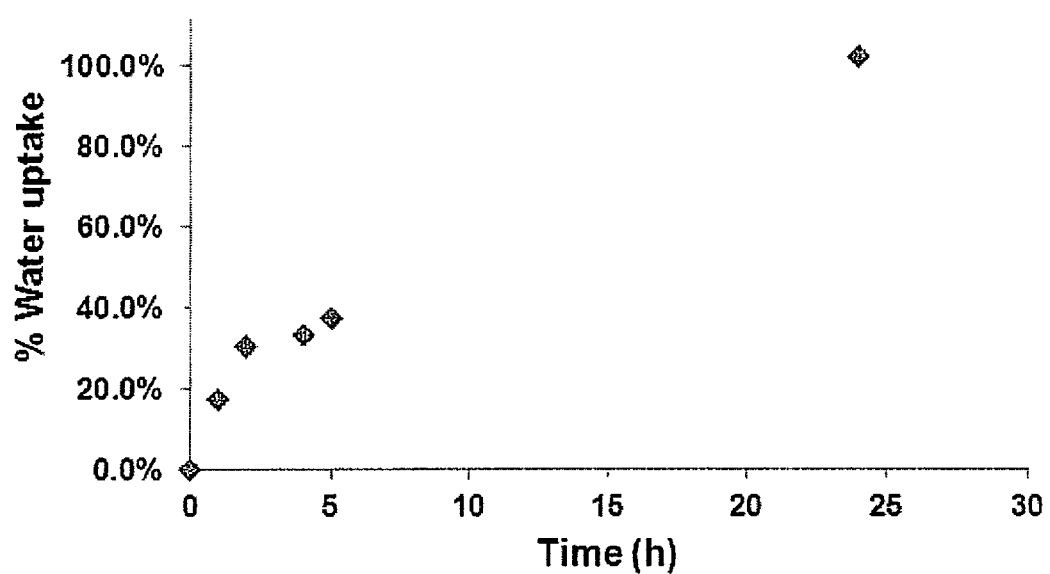
FIG. 1 is a graph showing the percentage water uptake over time for Example 7.

In the specification and claims herein, the following terms and expressions are to be understood as indicated.

As used in the specification and including the appended claims, the singular forms "a," "an," and "the" include the plural, and reference to a particular numerical value includes at least that particular value, unless the context clearly dictates otherwise.

Ranges can be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Other than in the working examples or where otherwise indicated, all numbers expressing amounts of materials, reaction conditions, time durations, quantified properties of materials, and so forth, stated in the specification are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon" means any hydrocarbon group from which one or more hydrogen atoms has been removed and is inclusive of alkyl, alkenyl, alkynyl, cyclic alkyl, cyclic alkenyl, cyclic alkynyl, aryl, aralkyl and arenyl and may contain heteroatoms.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

It will be understood herein that all measures of viscosity are obtained at 25 degrees Celsius unless noted otherwise.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

This invention relates to actinic radiation or thermal curable composition containing silicone ionomers which are the polyorganosiloxanes containing ions and have at least one radiation/thermal-curable functional group as part of their backbone. The composition of the present invention can undergo curing reaction in presence of actinic radiation or thermal energy making them very useful in many different applications including elastomers, RTVs, gels including, health care applications such as wound dressings, dressings for scar reduction, transdermal drug delivery patches, personal care applications, household applications, apparel, sportswear, paints, coatings, oil and gas, adhesives, pressure sensitive adhesives, waterborne coatings and adhesives, sealants, fuel cell, electronic application, agriculture, textiles, membranes, injection moldable and compression moldable rubbers and plastics, and various silicone based rubbers.

In the present invention, there is provided a radiation-curable composition of ionic silicone with the following formula:

$$M^1_a M^2_b M^3_c D^1_d D^2_e D^3_f T^1_g T^2_h T^3_i Q_j. \quad (I)$$

wherein:

$$M^1 = R^1 R^2 R^3 SiO_{1/2}$$

$$M^2 = R^4 R^5 R^6 SiO_{1/2}$$

$$M^3 = R^7 R^8 R^9 SiO_{1/2}$$

$$D^1 = R^{10} R^{11} SiO_{2/2}$$

$$D^2 = R^{12} R^{13} SiO_{2/2}$$

$$D^3 = R^{14} R^{15} SiO_{2/2}$$

$$T^1 = R^{16} SiO_{3/2}$$

$$T^2 = R^{17} SiO_{3/2}$$

$$T^3 = R^{18} SiO_{3/2}$$

$$Q = SiO_{4/2}$$

wherein $R^1$, $R^2$, $R^5$, $R^6$, $R^8$, $R^9$, $R^{11}$, $R^{13}$, $R^{15}$ are aliphatic, aromatic or fluoro monovalent hydrocarbon having from 1 to 60 carbon atoms. Example of useful hydrocarbon groups includes methyl, ethyl, n-propyl, iso-propyl, n-butyl, isobutyl, tert-butyl, n-pentyl, iso-pentyl, neopentyl and tert-pentyl; hexyl, such as the n-hexyl group; heptyl, such as the n-heptyl group; octyl, such as the n-octyl and isooctyl groups and the 2,2,4-trimethylpentyl group; nonyl, such as the n-nonyl group; decyl, such as the n-decyl group; cycloalkyl radicals, such as cyclopentyl, cyclohexyl and cycloheptyl radicals and methylcyclohexyl radicals. Examples of aryl groups include phenyl, naphthyl; o-, m- and p-tolyl, xylyl, ethylphenyl, and benzyl.

wherein $R^3$, $R^{10}$, $R^{16}$ are independently selected from —$CH_2CH(R')(C_nH_{2n})$—O—$(C_2H_4O)_o$—$(C_3H_6O)_p$—$(C_4H_8O)_q$—R', wherein subscript n is zero or positive and has a value in the range of 0 to 6, subscripts o, p and q are zero or positive and independently selected from a value in the range of 0 to 100, subject to the limitation of o+p+q greater than or equal to 1. R' can be hydrogen or an aliphatic, aromatic or fluoro hydrocarbon having from 1 to 60 carbon atoms, or R' can be independently chosen from glycolide {—C(O)CH$_2$O—}, lactide {—C(O)CH(CH$_3$)O—}, butyrolactide {—C(O)CH$_2$CH$_2$CH$_2$O—} and caprolactide {—C(O)CH$_2$CH$_2$CH$_2$CH$_2$CH$_2$O—} radicals or hydrocarbon radical defined by $R^1$.

$R^4$, $R^{12}$, $R^{17}$ are monovalent radical-bearing ion-pairs having the formula (II)

$$A-I^{x-}M_n^{y+} \quad (II);$$

where A is a spacing group having at least one spacing atom selected from a divalent hydrocarbon or hydrocarbonoxy group, where I is ionic groups such as sulfonate —SO$_3^-$, sulfate —OSO$_3^-$, carboxylate —COO$^-$, phosphonate —PO$_3^{2-}$, or phosphate —OPO$_3^{2-}$ groups, more specifically sulfonate —SO$^{3-}$, where M is hydrogen or a cation independently selected from alkali metals, alkaline earth metals, rare earth metals, transition metals, metals, metal complexes, quaternary ammonium and phosphonium groups, hydrocarbon cations, alkyl cations, organic cations, and cationic polymers.

Alternatively, $R^4$, $R^{12}$, $R^{17}$ can be zwitterions having the formula (III):

$$-R'-NR''_2^+-R'''-I \quad (III)$$

where R' is a divalent hydrocarbon radical containing from 1 to about 60 carbon atoms, specifically from 1 to about 20 carbon atoms, and more specifically from 1 to about 8 carbon atoms, R" is monovalent hydrocarbon radical containing from 1 to about 60 carbon atoms, specifically from 1 to about 20 carbon atoms and more specifically from 1 to about 8 carbon atoms, and where R''' is divalent hydrocarbon radical containing from 2 to about 20 carbon atoms, specifically from 2 to about 8 carbon atoms and more specifically from 2 to about 4 carbon atoms; and, I is an ionic group such as sulfonate —SO$_3^-$, sulfate —OSO$_3^-$, carboxylate —COO$^-$, phosphonate —PO$_3^{2-}$, or phosphate —OPO$_3^{2-}$ groups where subscript n and superscript y are independently from 1 to 6 and x is the product of n times y, where the subscript a, b, c, d, e, f, g, h, i, j are zero or positive subject to the following limitations: to the sum a+b+c+d+e+f+g+h+i+j is greater than or equal to 2 and less than or equal to 6000, specifically the sum a+b+c+d+e+f+g+h+i+j is greater than or equal to 2 and less than or equal to 4000, more specifically the sum a+b+c+d+e+f+g+h+i+j is greater than or equal to 2 and less than or equal to 2000, the sum b+e+h greater than 0 and the sum c+f+i greater than 0.

In one other embodiment herein the divalent hydrocarbon group of A in formula (II) is an arylene group selected from the group consisting of —(CH$_2$)$_l$C$_6$H$_4$(CH$_2$)$_k$—, —CH$_2$CH(CH$_3$)(CH$_2$)$_k$C$_6$H$_4$—, —CH$_2$CH(R$^1$)(CH$_2$)$_l$C$_6$H$_3$R$^{19}$—CH$_2$CH(R$^1$)(CH$_2$)$_l$C$_6$H$_2$R$^1$R$^{19}$ where R$^1$ is as defined, R$^{19}$ is a monovalent radical specifically from about 1 to about 20 carbon atoms, more specifically from about 1 to about 8 carbon atoms, sulfur atom(s), nitrogen atom(s), oxygen atom(s) or a radical containing combinations of the above atoms, where l has a value of 0 to 20, specifically from 1 to about 10 and k has a value of 0 to 20, specifically from 0 to about 10.

In another embodiment, the divalent hydrocarbon group of A in formula (II) is an alkylene group of the formula —(CHR$^{20}$)$_m$— where m has a value of 1 to 20, specifically, from 1 to about 10 and R$^{20}$ is hydrogen or R$^1$.

In another embodiment the divalent hydrocarbonoxy group of A in formula (II) is selected from (CHR$^{20}$)$_m$—(OCHR$^{20}$CH$_2$)$_p$—O—(CH$_2$)$_l$— where l has a value of from 0 to 20, specifically from 1 to about 10, m has a value of 0 to 50 and p has the value from 1 to 50 and R$^{20}$ is as defined.

In one other embodiment, in formula (II) M can be a cation independently selected from Li, Na, K, Cs, Mg, Ca, Ba, Zn, Cu, Fe, Ni, Ga, Al, Mn, Cr, Ag, Au, Pt, Pd, Pb, Sb, Ru, Sn, Ce, La, Co, Gd, Eu and Rh. One skilled in the art can understand that the cations can exist in multivalent forms, e.g., Mn$^{+2}$ and Mn$^{+3}$.

$R^7$, $R^{14}$, $R^{18}$ are curable functional groups independently selected from the group of the following general formula:

(IV)

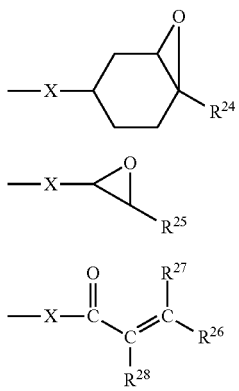

wherein $R^{21}$ to $R^{28}$ are independently selected from hydrogen, aliphatic/aromatic monovalent hydrocarbon having from 1 to 60 carbon atoms where X is a divalent hydrocarbon linkage consisting of 1 to 60 carbon atoms and 0 to 20 heteroatoms such as oxygen, nitrogen and sulfur.

When the curable groups in the formula (I) is a vinyl of the general formula (IV) or an acrylate or acrylamide or methacrylate of general formula (VII), the composition of the present invention preferable contain 0.001-10 parts by weight thermal or photoinitiators selected from but not limited to the carbonyl compounds such as benzoin, benzoin methyl ether, benzoin ethyl ether, benzoin propyl ether, benzoin-n-butyl ether, benzoin isobutyl ether, acetoin, butyroin, toluoin, benzil, benzophenone, para methoxybenzophenone, 2,2-diethoxyacetophenone, alpha-alpha-dimethoxy-alpha-phenylacetophenone, methylphenyl glyoxylate, ethyphenyl glyoxylate, 4,4'-bis-(dimethylaminobenzophenone), propiophenone, acetophenone, 1-hydroxycyclohexyl phenyl ketone, 2,2-diethoxyacetophenone, ethlphenylpyloxylate, phenanthraquinone, and 2-hydroxy-2-methyl-1-phenyl-propan-1-one; sulfur compounds such as tetramethylthiuram monosulfide and tetramethylthiuram disulfide; azo compounds such as azobisisobutyronitrile and azobis-2,4-dimethylvaleronitrile; and organic peroxide compounds such as benzoyl peroxide, dicumyl peroxide, methyl ethyl ketone peroxide; acetone peroxide, and di-tert-butyl peroxide, thioxanthone photoinitiators such as 7-chlorothioxanthone, 2,4-diethylthioxanthone and 2,4-diisopropylthioxanthone; and acylophosphine oxide photoinitiators. In addition to those above, commercially available proprietary free radical initiator compositions such as but not limited to Irgacure (Ciba Speciality Chemicals), VAZO (DuPont), Darcure etc. can also be used to the same effect.

When the curable groups in the formula (I) is a vinyl of general formula (IV) or an acrylate of general formula (VII), the composition can comprise of 0 to 99 parts by weight of the following:

Acrylate Derivatives:

Typical acrylate derivatives are the condensation products of acrylic acid, alkyl-substituted acrylic acid and various alcohols, amines or similar nucleophilic substituents, and are specifically selected from the group consisting of any monomeric or oligomeric molecule possessing one or more acrylic, methacrylic, ethacrylic groups that can be co-cured with the composition. Preferably, the acrylate derivatives are selected from the group consisting of methacrylate, butylacrylate, propylacrylate, N,N-dimethylacrylamide, methacrylic acid, N-isopropyl acrylamide, 2-hydroxy-ethyl-methacrylate (HEMA), and methacrylic acid, 3-[tris(trimethylsiloxy)silyl] propyl methacrylate, acrylate and methacrylate functional carbosilane molecules, hexafunctional urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated trimethylolpropane triacrylate, butanediol diacrylate, tripropylene glycol diacrylate, trimethylolpropane trimethacrylate, oligofunctional urethane acrylates, tetraacrylate monomer, polyester acrylate oligomers, and combinations thereof.

Ethylenically Unsaturated Derivatives:

These compounds are such that they possess at least one reactive vinyl group which is not an acrylate group, and which can undergo a free radical initiated coupling with the vinyl and acrylate groups of formula (I) above. Examples of such compounds include but are not limited to monomers such as styrene, divinyl benzene, N-vinyl pyrrolidone, N-vinyl lactam, vinyl halides, vinyl acetates, vinyl alcohols, allyl alcohols, allyl polyethers and others that can react with the —SiVi group.

Thiol Derivatives:

Typically exemplified by monomers and polymers possessing free thiol (—SH) groups, these can react via a free radical mechanism with the vinyl and acrylate groups exemplified by formula (IV) and (VII) above. Some non-limiting examples include mercapto-alcohols, mercapto-acetic acids, thioesters, and the like.

When the curable groups in the formula (I) is an epoxide of general formula (V and VI), the composition of the present invention preferably contain 0.1-20 parts by weight of cationic photoinitiators particularly those known in the prior arts such as diaryliodonium salts, triarylsulfonium salts, triarylselenonium salts, tetraarylphosphonium salts and aryldiazonium salts, represented by the formulas $R^{29}_2I^+Y^-$, $R^{29}_3S^+Y^-$, $R^{29}_3Se^+Y^-$, $R^{29}_4P^+Y^-$ and $R^{29}_4N^+Y^-$ respectively (wherein, $R^{29}$ represents an aryl group, and $Y^-$ represents an anion such as $SbF_6^-$, $AsF_6^-$, $PF_6^-$, $BF_4^-$, $HSO_4^-$ and $ClO_4^-$).

When the curable groups in the formula (I) is an epoxide of general formula (V and VI), the composition can contain 0-99 parts by weight of fluorinated organic molecules which can be used to co-cure with the composition (I) include alcohols, polyols, acrylates, epoxies, vinyl ethers, and other fluoro-organic molecules. One preferred group of fluoro-organic molecules is fluorine-containing aliphatic alcohols having from 1 to about 10 carbon atoms.

Additionally, the composition may contain 0 to 50 parts by weight of photosensitizers such as benzoin methyl ether and benzophenone/dimethyl ethanol amine in an amount suitable to facilitate a crosslinking reaction when exposed to UV light.

The curable composition may optionally contain 0-99 parts by weight of reinforcing filler like fumed silica, nano silica, functionalized or unfunctionalized silicone resins, clay, kaolin, metal nanoparticles, metal oxide nanoparticles with or without modification, inorganic fillers such as calcium carbonate, glass, fiberglass, natural and synthetic fibers, cork, graphite, carbon black, carbon nanotubes, graphite, graphene, boron nitride, polysaccharides, etc.

The curable composition may optionally contain light stabilizers or UV absorbers. These materials will be included in varying amounts in accordance with the particular use or application desired. When included, their amounts will be sufficient to provide increased weatherability yet still obtain adequate cure response for the composition. In one embodiment the ultra violet absorbers include hydroxybenzophenones; benzotriazoles; cyanoacrylates; triazines; oxanilide derivatives; poly(ethylene naphthalate); hindered amine; formamidines; cinnamates; malonate derivatives and mixtures thereof. Examples of UV-visible absorbers which may be useful according to the method of the present invention include 2-(2'-hydroxy-5'-methylphenyl)benzotriazole; 2-(3'-tert-butyl-2'-hydroxy-5'-methylphenyl)-5-chlorobenzotriazole; 2-(3',5'-di-tert-butyl-2'-hydroxyphenyl)-5-chlorobenzotriazole; 2,2'-dihydroxy-4,4'-dimethoxybenzophenone; 2-(4,6-diphenyl-1,3,5-triazin-2-yl)-5-(hexyloxy)-phenol; 2-(4,6-bis(2,4-dimethylphenyl)-1,3,5-triazin-2-yl-5-octyloxy) phenol; 2-(2'-hydroxy-5'-methylphenyl)benzotriazole; 2,4-dihydroxybenzophenone; 2,4,2',4'-tetrahydroxybenzophenone; 2-hydroxy-4-ocytyloxybenzophenone; 2-hydroxy-4-methoxybenzophenone; phenyl salicylate; phenyl benzoate 2-hydroxybenzophenone; 5-chloro-2-hydroxy-benzophenone; 2-hydroxy-4-n-octoxybenzo-phenone; 4-dodecyloxy-2-hydroxybenzophenone; 2-hydroxy-4-octadecyloxybenzophenone; 2,2'-dihydroxymethoxybenzophenone; 2,2'-dihydroxy-4-4-dimethoxybenzophenone; para tert-butylphenyl salicylate; p (1,1,3,3 tetramethylbutyl)phenyl salicylate; 3-hydroxyphenyl benzoate; phenylene-1,3-dibenzoate; 2-(2-hydroxy-5-methylphenyl)benzotriazole; 2-(2-hydroxy-5-tertbutylphenyl)-5-chlorobenzotriazole; 2-(2-hydroxy-3,5-di-tert-butylphenyl)benzotriazole; 2-(2-hydroxy-5-tert-butylphenyl)benzotriazole; 2-(2-hydroxy-4-octyloxyphenyl)benzotriazole and mixtures thereof. An additional component selected from UV stabilizer, cure accelerator, pigment, dye, antimicrobial agent, biocide, surfactant, conductive filler, non-reinforcing fillers such as finely divided surface treated/untreated metal oxides (e.g. titania, zirconia ceria, etc), clay, plasticizers, tackifiers, mold release agents, adhesion promoters, compatibilizers, pharmaceutical excipients, surfactants, antistatic agent.

The curable composition may optionally contain suitable solvent selected from the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, and sulfoxide solvents.

The curable acrylate coating composition may also optionally contain various additives such as flattening agents (e.g., BYK®-353, available from BYK-Chemie), surface active agents (e.g. BYK®-Siclean 3700, available from BYK-Chemie), thixotropic agents (e.g., cellulose acetate butyrate, available from Aldrich Chemicals), and the like, and reaction products and combinations comprising at least one of the foregoing additives.

The present invention on the radiation curable ionic silicone composition is based on the ionic silicones that can undergo free radical curing either thermally or under actinic radiation to provide films, adhesives and hydrogels, with excellent physical properties such as tensile strength, tear strength, modulus, customizable tack and adhesive behavior, permeability to water vapor, and the ability to deliver active ingredients. The free radical cure compositions produced according to the invention are suitable for many applications in which the known advantageous properties of the silicones and the properties that could be derived from the ionic clusters are important, preferably in the fields of healthcare, personal care, automobile, electronics/electrical, aerospace, membranes, adhesives, fuel cells, construction, apparel, production of domestic appliances, machine and instrument construction.

The composition comprising radiation curable compositions of the present invention can be utilized for numerous healthcare applications comprising of drug delivery systems, transdermal patches, wound healing patches, wound dressing patches, wound management devices, iontophoretic devices, scaffolds for tissue engineering, antimicrobial devices, hydrogels, ophthalmic devices, bioinserts, wound healing gels, wound dressing adhesives, medical adhesives, medical storage devices, reconstructive devices, prostheses, bioinserts, plugs and body implants.

In such an application the composition forming the subject of present invention can be manifested in various physical forms incorporating numerous substances of therapeutic value, and depending upon the intended application. Examples of pharmaceutically active ingredients that can included in the healthcare compositions comprising thermal/radiation crosslinked polyorganosiloxanes include but are not limited to: bioactives, anti-acne agents, anti-ageing agents, anti-fungal agents, anti-caries agents, anti-microbial agents, anti-oxidants, anti-cancer, anti-viral, anti-inflammatory, anti-coagulants, hemostatic agents, exfoliants, hormones and hormone analogs, enzymes, medicinal compounds, biocides, external analgesics, antidepressants, incontinence aids, anti-cholinergic agents, oral care drugs, oxidizers, reducing agents, skin protectants, essential oils, insect repellants, UV absorbers, sun protection agents, pigments, hydrating agents, vitamins and combinations thereof.

A particularly useful healthcare related application that can comprise the present invention is silicone-acrylate adhesive patches for transdermal drug delivery. Such systems are known in current art, and provide the combined advantages of acrylic and silicone adhesive systems. However, incorporation of acrylate functional ionic silicones in the system will enable compatibility with numerous hydrophilic drugs while increasing the breathability of the system over and above that provided by the organic monomers alone.

The aforementioned transdermal delivery system is typically formulated as a drug-in-adhesive matrix or its different variants, and comprise of one or more agents of therapeutic value. Additionally, many such agents can be bound to the ionic moieties within the silicones, which may further reduce their potential to re-crystalize, thereby increasing the shelf life.

Additionally, the free radical cure composition of the present invention can be rendered antimicrobial via contact with an antimicrobial agent exemplified by but not limited to silver, copper, zinc, chlorhexidine, benzalkonium chloride, biguanide, polyquaternary ammonium compounds chitosan and its derivatives, antimicrobial peptides such as but not limited to nisin, pediocin, gomesin, pleuricidin and their derivatives and their recombinant forms.

The free radical cure compositions of the present invention can be prepared via emulsion polymerization involving the emulsification and subsequent polymerization of the component (I) and other co-reactants by a judicious use of suitable solvents, surfactants and co-surfactants.

Such emulsion polymerized compositions can be further processed to yield waterborne coatings and adhesives, which can be utilized in many applications where the use of organic solvents as well as residual reactive monomers is not desired.

The free radical cure compositions of the present invention can be manifested in such as copolymers, gels, and emulsions which are particularly useful in personal care applications wherein said personal care component includes one or more deodorants, antiperspirants, antiperspirant/deodorants, sticks and roll-on products, skin lotions, moisturizers, toners, cleansing products, styling gels, hair dyes, hair color products, hair straighteners, nail polish, nail polish remover, sunscreen, anti-aging products, lipsticks, foundations, face powders, eye liners, eye shadows, blushes, makeup, mascaras, moisturizing preparations, foundations, body and hand preparations, skin care preparations, face and neck preparations, fragrance preparations, soft focus applications, night and day skin care preparations, tanning preparations, hand liquids, non-woven applications for personal care, baby lotions facial cleansing products, hair cuticle coats, personal care rinse-off products, gels, foam baths, scrubbing cleansers, controlled-release personal care products, hair conditioning mists, skin care moisturizing mists, skin wipes, pore skin wipes, pore cleaners, blemish reducers, skin exfoliators, skin desquamation enhancers, skin towelettes and cloths, depilatory preparations, personal care lubricants, nail coloring preparations, drug delivery systems for topical application of medicinal compositions that are to be applied to the skin and combinations thereof.

EXAMPLE 1

Sulfonate Functionalized Polyorganosiloxanes Bearing Terminal Hydride Groups

A three necked flask was charged with 354.0 g (3000.0 mmol) of alpha-methyl styrene, and $5.04 \times 10^{-3}$ g of Speier's catalyst. The resulting mixture was heated to 115 degrees Celsius while stirring under positive nitrogen flow. To this 150.0 g (625.0 mmol) 1,3,5,7 tetramethylcyclotetrasiloxane was added gradually. The progress of reaction was monitored by $^1$H NMR for the disappearance of silicone hydride peak. After completion of reaction, the reaction mixture was vacuum stripped at low pressure to remove unreacted alpha-methyl styrene to give 424 g (84%) aryl substituted cyclotetrasiloxane, and the structure was confirmed via NMR.

To 5.0 g (7.0 mmol) of above aryl substituted cyclotetrasiloxane, 10 ml of dichloromethane was added, and under vigorous stirring at room temperature 6.54 g (56.0 mmol) of chlorosulfonic acid was added gradually. The resulting viscous mixture was stirred for additional 45 minutes. To this 155.2 g (526.6 mmol) of octamethyltetracyclosiloxane and 1.88 g (14.0 mmol) of 1,1,3,3 tetramethyldisiloxane was added and continued to stir at room temperature. After reaching at solid content of 80%, the reaction mixture was neutralized using 9.43 g (112.0 mmol) moistened sodium bicarbonate at 75 degrees Celsius. The vacuum stripping of reaction mixture at 120 degrees Celsius afforded 148 g (83%) the product. The NMR analysis of the product indicated that the polymer is a sulfonated polydimethylsiloxane with terminal hydride groups.

EXAMPLE 2

Sulfonated Functionalized Polyorganosiloxanes Bearing Terminal Acrylate Groups

To 50.0 g (4.7 mmol) of sulfonated functionalized polyorganosiloxanes with terminal hydride group from example 1, 150 ml of toluene was added and the reaction mixture was heated to 80 degrees Celsius. At this point $8.08 \times 10^{-3}$ g of Speier's catalyst was added and the reaction mixture was further heated to 105° C. To this 1.40 degrees Celsius 2 g (11.29 mmol) of vinylcyclohexyl epoxide was added gradually. The reaction was monitored with $^1$H NMR for the disappearance of silicone hydride peak. After completion of reaction, the reaction mixture was vacuum stripped to yield 48 g (94%) of sulfonate functionalized silicone with terminal epoxy group.

To 48.0 (4.33 mmol) of sulfonate functionalized silicone with terminal epoxy group, 100 ml of toluene was added and the reaction mixture was heated to 90 degrees Celsius. To this mixture $4.88 \times 10^{-2}$ g of titanium isopropoxide and 5 mg of 2,2,6,6-tetramethyl-1-piperidinoxyl (TEMPO) is added. The reaction mixture is further heated to 105 degrees Celsius and then 0.748 g (10.39 mmol) of acrylic acid was added gradually. The reaction mixture was monitored with $^1$H NMR for the disappearance of epoxy peak. After completion of reaction, the reaction mixture was vacuum stripped at 40 degrees Celsius to yield 45 g of sulfonate functionalized silicone with terminal acrylate group.

EXAMPLE 3A

Sulfonic Acid Functionalized Tetramethylcyclotetrasiloxane

A three necked 500 mL flask was charged with 70.08 g (60.0 mmol) alpha-methylstyrene and $10.0 \times 10^{-4}$ g platinum catalyst. The temperature of the resulting mixture was brought to 115 degrees Celsius, then 30.0 g (120.5 mmol) of 1,3,5,7-tetramethylcyclotetrasiloxane was added drop wise and continued to stir. The progress of the reaction mixture was monitored by $^1$H NMR. After 12 h of the reaction, complete conversion of silicone hydride was indicated by the NMR. Then, the reaction mixture was vacuum stripped at 150 degrees Celsius for 2 h to remove unreacted alpha-methylstyrene which gave 80.5 g aralkylene substituted cyclotetrasiloxane. (Yield: 95%))

To 14.24 g (20.0 mmol) of the above aralkylene substituted cyclotetrasiloxane, 18.64 g (160.0 mmol) chlorosulfonic acid dissolved in 4.0 mL dichloromethane was added drop wise through a period of 30 minutes while the mixture being stirred at room temperature. The resulting mixture was stirred for an additional 30 minutes. The completion of the reaction was indicated by $^1$H NMR where complete sulfonation of the aromatic ring was indicated by the disappearance of para-substituted aromatic proton peak. The vacuum stripping of the reaction mixture at low pressure afforded 20.6 g of the sulfonic acid functional cyclotetrasiloxane as brown viscous gum. $^1$H NMR and $^{29}$Si NMR confirmed the product formation.

EXAMPLE 3B

Sulfonate Functional Polyorganosiloxane Bearing Terminal Vinyl Groups

To the sulfonic acid functional cyclotetrasiloxane 5.7 g (8.0 mmol) obtained above, 474.7 g (1600.0 mmol) octamethyltetracyclosiloxane and 1.48 g (8.0 mmol) of 1,1,3,3-tetramethyl-1,3-divinyldisiloxane were added and continued to stir at room temperature. After reaching equilibrium of ~87 wt % of the linear siloxanes, the reaction mixture was neutralized using 10.0 g (128.0 mmol) moistened sodium bicarbonate at 70 degrees Celsius. The vacuum stripping of the reaction mixture at low pressure afforded 411.0 g of the product as viscous gum. The NMR analysis of the product indicated that the polymer is vinyl-terminated sulfonated polydimethylsiloxane. (Yield: 84%)

EXAMPLE 4

Bulk Polymerization of Sulfonate Functionalized Silicone Bearing Terminal Acrylate Groups Curable compositions were prepared as shown in Table 1 below, consisting of acrylate monomers, sulfonate functionalized silicone bearing terminal acrylate group (example 2), 1,6-hexandiol diacrylate and 2-hydroxy-2-methyl propionphenone (UV initiator, 0.5 parts by weight). The compositions were transferred into PET (poly(ethylene terephthalate)) to a measuring gap of 1 mm. The formulations were cured by exposure to UV irradiation of 105 mW/cm$^2$.

TABLE 1

| Ingredients (parts by weight) | 3A | 3B | 3C | 3D | 3E |
|---|---|---|---|---|---|
| Functionalized Silicone | 0 | 10 | 10 | 10 | 5 |
| Butyl acrylate | 90 | 90 | 90 | 90 | 0 |
| Lauryl acrylate | 0 | 0 | 0 | 0 | 95 |
| 1,6-hexanediol diacrylate | 10 | 0 | 0.25 | 0.5 | 0.25 |
| Physical form | Self-standing film | Adhesive | Self-standing film | Self-standing film | Self-standing film |
| % water absorption | 2.6 | Not Determined | 26 | 7 | 4 |

EXAMPLE 5

Solution Polymerization of Sulfonate Functionalized Silicone Bearing Terminal Acrylate Groups 2 Grams (8.9×10$^{-5}$ mmol) of sulfonate functionalized silicone bearing terminal acrylate groups (example 2), 10 ml of toluene, 1.78 g (8.9×10$^{-2}$ mmol) methyl methacrylate was charged in reaction flask equipped with reflux condenser and the reaction mixture was heated to 65 degrees Celsius under nitrogen atmosphere. To this 2,2'-azo-bis(isobutyronitrile) (AIBN) (0.1 mole %) was added and the reaction was allowed to continue overnight. The reaction mixture was vacuum stripped to yield light yellow colored powdery polymer. $^1$H NMR indicated near complete conversion of methyl methacrylate monomer ($M_n$ ~30,000). The polydispersity index (PDI) of the polymer was around 1.8 which is typical of free radical polymerization.

Coating formulation was prepared by solubilizing above polymer (20 parts by weight) in ethyl acetate and was direct coated on the surface of PET (poly(ethylene terephthalate)) to a wet film thickness of 24 microns and dried at room temperature for 2 hours.

EXAMPLE 6

Emulsion Polymerization of Sulfonate Functionalized Silicone Bearing Terminal Acrylate Groups 2.4 Parts by weight of sulfonate functionalized silicone bearing terminal acrylate groups (example 2) was added to 21.6 parts of butyl acrylate and 1 part of cetyl alcohol. This organic mix was dispersed in an aqueous phase of 67 parts of water and 8 parts of sodium lauryl ether sulfate (SLES) at high shear rate to form an emulsion. Dynamic light scattering data indicated formation of polydispersed particles with size ranging from 84 to 240 nm in diameter. The emulsion was subjected to ultra-sonication to obtain miniemulsion with monodisperse particles size of about 60 nm. This mini-emulsion was charged in flask equipped with reflux condenser and the polymerization was initiated by adding potassium persulfate and heating the reaction to 75 degrees Celsius. The reaction was run for 4 hours to obtain latex copolymer with monodisperse particles of about 54 nm in diameter. The particle size was confirmed by transmission electron microscopy (TEM) technique. The resulting miniemulsion was transferred onto a dish and dried at room temperature for 24 hours followed by drying in oven at 55 degrees Celsius for 3 hours to obtain film.

EXAMPLE 6A

Crosslinked Network of Sulfonate Functionalized Silicone Bearing Terminal Acrylate Groups Sulfonate functionalized silicone bearing terminal acrylate groups (Example 2) were dissolved in toluene solvent, and the following formulation was prepared:

TABLE 2

| Component | Weight (gm) | Wt % |
|---|---|---|
| Sulfonate functional silicone (example 2) | 1 | 96.6% |
| Pentaerythritol tetracrylate crosslinker | 0.01 | 1.0% |
| 2 hydroxy 2 methyl propiophenone initiator | 0.015 | 1.4% |
| N,N,N,N-tetramethyl-ethylenediamine | 0.01 | 1.0% |

The mixture was cured using UV irradiation (105 mW/cm$^2$) to form a soft, translucent and freestanding film, which was further dried by toluene removal. The dried film was tested for water uptake. A pre-weighed film sample was immersed in de-ionized water over a period of 3 hours and was removed every hour and weighed. The percentage water uptake was calculated as % uptake=100×(Water$_{time}$−Water$_{initial}$)/Water$_{initial}$ and was found to be 52% over a 3 hour period.

EXAMPLE 7

Copolymer Network of Sulfonate Functionalized Silicone Bearing Terminal Acrylate Groups A 'working' solution was prepared by dissolving 1 g of the sulfonate-functional silicone (Example 2) in 3 ml toluene. To prepare the formulation, 0.5 g of N-isopropyl acrylamide (NIPAAm) was dissolved in 3 ml toluene, to which was added 1.5 ml of the sulfonate-functional silicone solution. To this mixture, 0.02 g of 2-hydroxyl-2-methylpropiophenone UV initiator and 0.02 g pentaerythritol tetraacrylate crosslinker were added and dissolved. The mixture was cured under UV radiation (105 mW/cm$^2$) to yield a clear film. The film thus obtained was tested for water uptake over a period of 24 hours. About 100% water uptake was observed over 24 hours as shown in FIG. 1.

EXAMPLE 8

Pressure Sensitive Adhesive Emulsion Containing Sulfonate Functionalized Silicone Bearing Terminal Acrylate Groups An oil-in-water emulsion was prepared by dispersing an organic phase in an aqueous phase.
The organic phase composition was as follows:

TABLE 3

| Component | Weight (gm) | wt % |
|---|---|---|
| Acrylate-functional ionic silicone (Example 2) | 1.6 | 10% |
| Cetyl alcohol | 0.64 | 4% |

TABLE 3-continued

| Component | Weight (gm) | wt % |
|---|---|---|
| Lauryl acrylate | 6.88 | 43% |
| Iso-octyl acrylate | 6.88 | 43% |

The aqueous phase composition was as follows:

TABLE 4

| Component | Weight (gm) | % |
|---|---|---|
| SLES (surfactant) | 4 | 11% |
| DI water | 33.5 | 89% |

The emulsion was prepared by adding 12.5 g of the organic phase into 37.5 gm of aqueous phase and blending using a high-shear homogenizer. After the emulsion was prepared, 0.031 g (0.25%) of ethylene glycol dimethyl acrylate crosslinker and 0.031 g initiator (0.25%) was added, and the mixture was heated under a nitrogen blanket at 80 degrees Celsius with constant stirring. To track the polymerization, the total solid content was measured at intervals. After overnight stirring, a white emulsion was obtained. The emulsion was cast on an aluminum pan and the water was allowed to evaporate to yield a translucent, tacky adhesive film.

Tackiness of the dried adhesive was measured using the Dia-stron MTT 175 miniature tensile tester, with the parallel plate attachment provided for tack measurement. A small amount of the emulsion was placed on the lower of the parallel-plate attachment and allowed to dry to a tacky film over a period of 48 hours at room temperature. For tack measurement, a load of 50 gm was applied to the film (35 cm² adhesive area) for a period of 30 seconds using the force arm of the instrument. Under these conditions, an average peak tack force value of 313.695±13.94 ($gm_f$) was obtained.

EXAMPLE 9

Ionic Silicone Containing Peroxide-Cured Silicone Rubber

Vinyl-functional sulfonated silicone (example 3b) was blended at a loading of 50% by weight into a general purpose silicone rubber formulation TSE 221-5U from Momentive Performance Materials. In addition to the inherently present filler, varying amounts of nanoclay (Cloisite 30B) were added to the formulation. The formulation was compression molded at a temperature of 180 degrees Celsius by use of a proprietary mixture of peroxide thermal initiators. The resulting rubber sheets were evaluated for mechanical properties and hardness and the following results were obtained:

TABLE 5

| Formulation | Tensile Strength (MPa) | % Strain | Modulus @ 100% strain | Hardness Shore A |
|---|---|---|---|---|
| Silicone rubber + 50% ionic silicone | 4.7 | 325.1 | 1.89 | 43 |
| Silicone rubber + 50% ionic silicone + 2.5% clay | 5.7 | 311 | 2.44 | 53 |
| Silicone rubber + 50% ionic silicone + 5% clay | 5.6 | 324.6 | 2.551 | 53 |

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A composition comprising an actinic radiation curable or thermally curable polyorganosiloxane ionomer having the general formula:

$$M^1{}_a M^2{}_b M^3{}_c D^1{}_d D^2{}_e D^3{}_f T^1{}_g T^2{}_h T^3{}_i Q_j \quad (I)$$

wherein:

$M^1 = R^1 R^2 R^3 SiO_{1/2}$ $M^2 = R^4 R^5 R^6 SiO_{1/2}$ $M^3 = R^7 R^8 R^9 SiO_{1/2}$ $D^1 = R^{10} R^{11} SiO_{2/2}$ $D^2 = R^{12} R^{13} SiO_{2/2}$ $D^3 = R^{14} R^{15} SiO_{2/2}$ $T^1 = R^{16} SiO_{3/2}$ $T^2 = R^{17} SiO_{3/2}$ $Q = SiO_{4/2}$ wherein $R^1$, $R^2$, $R^5$, $R^6$, $R^8$, $R^9$, $R^{11}$, $R^{13}$, $R^{15}$ are aliphatic, aromatic or fluoro monovalent hydrocarbon having from 1 to 60 carbon atoms, wherein $R^3$, $R^{10}$, $R^{16}$ are independently selected from —CH$_2$CH(R')(C$_n$H$_2$n)—O—(C$_2$H$_4$O)$_o$—(C$_3$H$_6$O)$_p$—(C$_4$H$_8$O)$_q$—R', wherein subscript n is zero or positive and has a value in the range of 0 to 6, subscripts o, p and q are zero or positive and independently selected from a value in the range of 0 to 100, subject to the limitation that the sum of o+p+q is greater than or equal to 1, R' is hydrogen or an aliphatic, aromatic or fluoro hydrocarbon having from 1 to 60 carbon atoms, wherein $R^4$, $R^{12}$, $R^{17}$ are selected from (i) or (ii):

(i) monovalent radical-bearing ion-pairs, substantially free of free radical polymerizable moieties, and having the formula (II)

$$A\text{-}I^{x-}M_n{}^{y+} \quad (II);$$

where A is a spacing group selected from a divalent hydrocarbon or hydrocarbonoxy group, where I is an ionic group selected from the group consisting of sulfonate —SO$_3^-$, sulfate —OSO$_3^-$, carboxylate —COO$^-$, phosphonate —PO$_3^{2-}$ and phosphate —OPO$_3^{2-}$ groups, where M is hydrogen or a cation independently selected from alkali metals, alkaline earth metals, transition metals, metals, metal complexes, quaternary ammonium groups, phosphonium groups, hydrocarbon cations, alkyl cations, organic cations, and cationic polymers, (ii) zwitterions having the formula (III):

$$—R'—NR''_2{}^+—R'''—I \quad (III)$$

where R' is a divalent hydrocarbon radical containing from 1 to about 60 carbon atoms, R'' is a monovalent hydrocarbon radical containing from 1 to about 60 carbon atoms, and where R''' is divalent hydrocarbon radical containing from 2 to about 20 carbon atoms, and, I is an ionic group selected from the group consisting of sulfonate —SO$_3^-$, sulfate —OSO$_3^-$, carboxylate —COO$^-$, phosphonate —PO$_3^{2-}$ and phosphate —OPO$_3^{2-}$ groups; and wherein R$^7$, R$^{14}$, R$^{18}$ are independently selected from the group consisting of unsaturated monovalent radicals and epoxy group containing radicals and are substantially free from ionic moieties; and where subscript n and superscript y are independently from 1 to 6 and x is the product of n times y, where the subscript a, b, c, d, e, f, g, h, i, j are zero or positive subject to the following provisos: the sum a+b+c+d+e+f+g+h+i+j is greater than or equal to 2 and less than or equal to 6000, d+e+f is at least 1, a+d+g is greater than zero, b+e+h is greater than zero, c+f+i is greater than zero and a+b+c is greater than zero.

2. A composition comprising an actinic radiation curable or thermally curable polyorganosiloxane ionomer having the general formula:

   (I)

wherein:

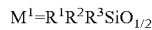

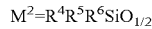

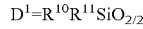

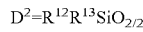

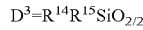

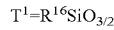

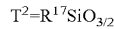

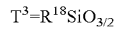

wherein R$^1$, R$^2$, R$^5$, R$^6$, R$^8$, R$^9$, R$^{11}$, R$^{13}$, R$^{15}$ are aliphatic, aromatic or fluoro monovalent hydrocarbon having from 1 to 60 carbon atoms, wherein R$^3$, R$^{10}$, R$^{16}$ are independently selected from —CH$_2$CH(R')(C$_n$H$_{2n}$)—O—(C$_2$H$_4$O)$_o$—(C$_3$H$_6$O)$_p$—(C$_4$H$_8$O)$_q$—R', wherein subscript n is zero or positive and has a value in the range of 0 to 6, subscripts o, p and q are zero or positive and independently selected from a value in the range of 0 to 100, subject to the limitation that the sum of o+p+q is greater than or equal to 1, R' is hydrogen or an aliphatic, aromatic or fluoro hydrocarbon having from 1 to 60 carbon atoms, wherein R$^4$, R$^{12}$, R$^{17}$ are selected from (i) or (ii):

(i) monovalent radical-bearing ion-pairs, substantially free of free radical polymerizable moieties, and having the formula (II)

A-X$^{x-}$M$_n^{y+}$   (II);

where A is a spacing group selected from a divalent hydrocarbon or hydrocarbonoxy group, where I is an ionic group selected from the group consisting of sulfonate —SO$_3^-$, sulfate —OSO$_3^-$, carboxylate —COO$^-$, phosphonate —PO$_3^{2-}$ and phosphate —OPO$_3^{2-}$ groups, where M is hydrogen or a cation independently selected from alkali metals, alkaline earth metals, transition metals, metals, metal complexes, quaternary ammonium groups, phosphonium groups, hydrocarbon cations, alkyl cations, organic cations, and cationic polymers, (ii) zwitterions having the formula (III):

—R'—NR''$_2^+$—R'''—I   (III)

where R' is a divalent hydrocarbon radical containing from 1 to about 60 carbon atoms, R'' is a monovalent hydrocarbon radical containing from 1 to about 60 carbon atoms, and where R''' is divalent hydrocarbon radical containing from 2 to about 20 carbon atoms, and, I is an ionic group selected from the group consisting of sulfonate —SO$_3^-$, sulfate —OSO$_3^-$, carboxylate —COO$^-$, phosphonate —PO$_3^{2-}$ and phosphate —OPO$_3^{2-}$ groups; and wherein R$^7$, R$^{14}$, R$^{18}$ are independently selected from the group consisting of unsaturated monovalent radicals and epoxy group containing radicals and are substantially free from ionic moieties; and where subscript n and superscript y are independently from 1 to 6 and x is the product of n times y, where the subscript a, b, c, d, e, f, g, h, i, j are zero or positive subject to the following provisos: the sum a+b+c+d+e+f+g+h+i+j is greater than or equal to 2 and less than or equal to 6000, d+e+f is at least 1, a+d+g is greater than zero, b+e+h is greater than zero, c+f+i is greater than zero and a+b+c is greater than zero, wherein the composition includes the divalent hydrocarbon group of A in formula (II), which is an arylene group selected from the group consisting of —(CH$_2$)$_l$C$_6$H$_4$(CH$_2$)$_k$—, —CH$_2$CH(CH$_3$)(CH$_2$)$_k$C$_6$H$_4$—, and —CH$_2$CH(R$^1$)(CH$_2$)$_l$C$_6$H$_3$R$^{19}$—, and —CH$_2$CH(R$^1$)(CH$_2$)$_l$C$_6$H$_2$R$_1$R$^{19}$— where R$^1$ is as defined, R$^{19}$ is selected from the group consisting of a monovalent radical having from 1 to about 20 carbon atoms, sulfur atom(s), nitrogen atom(s), oxygen atom(s) and a radical containing combinations of the above atoms, where l has a value of 0 to 20, and k has a value of 0 to 20.

3. The composition of claim 1 wherein the divalent hydrocarbon group of A in formula (II) is an alkylene group of the formula —(CHR$^{20}$)$_m$— where m has a value of 1 to 20, specifically, from 1 to about 10 and R$^{20}$ is hydrogen or R$^1$.

4. A composition comprising an actinic radiation curable or thermally curable polyorganosiloxane ionomer having the general formula:

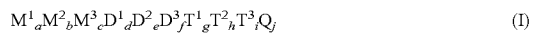   (I)

wherein:

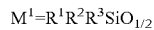

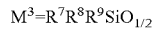

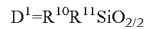

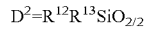

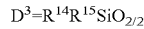

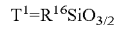

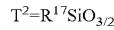

wherein $R^1$, $R^2$, $R^5$, $R^6$, $R^8$, $R^9$, $R^{11}$, $R^{13}$, $R^{15}$ are aliphatic, aromatic or fluoro monovalent hydrocarbon having from 1 to 60 carbon atoms, wherein $R^3$, $R^{10}$, $R^{16}$ are independently selected from —$CH_2CH(R')(C_nH_2n)$—O—$(C_2H_4O)_o$—$(C_3H_6O)_p$—$(C_4H_8O)_q$—R', wherein subscript n is zero or positive and has a value in the range of 0 to 6, subscripts o, p and q are zero or positive and independently selected from a value in the range of 0 to 100, subject to the limitation that the sum of o+p+q is greater than or equal to 1, R' is hydrogen or an aliphatic, aromatic or fluoro hydrocarbon having from 1 to 60 carbon atoms, wherein $R^4$, $R^{12}$, $R^{17}$ are selected from (i) or (ii):

(i) monovalent radical-bearing ion-pairs, substantially free of free radical polymerizable moieties, and having the formula (II)

$$A\text{-}X^{x-}M_n^{y+} \tag{II};$$

where A is a spacing group selected from a divalent hydrocarbon or hydrocarbonoxy group, where I is an ionic group selected from the group consisting of sulfonate —$SO_3^-$, sulfate —$OSO_3^-$, carboxylate —$COO^-$, phosphonate —$PO_3^{2-}$ and phosphate —$OPO_3^{2-}$ groups, where M is hydrogen or a cation independently selected from alkali metals, alkaline earth metals, transition metals, metals, metal complexes, quaternary ammonium groups, phosphonium groups, hydrocarbon cations, alkyl cations, organic cations, and cationic polymers, (ii) zwitterions having the formula (III):

$$\text{—R'—NR''}_2^+\text{—R'''-I} \tag{III}$$

where R' is a divalent hydrocarbon radical containing from 1 to about 60 carbon atoms, R'' is a monovalent hydrocarbon radical containing from 1 to about 60 carbon atoms, and where R''' is divalent hydrocarbon radical containing from 2 to about 20 carbon atoms, and, I is an ionic group selected from the group consisting of sulfonate —$SO_3^-$, sulfate —$OSO_3^-$, carboxylate —$COO^-$, phosphonate —$PO_3^{2-}$ and phosphate —$OPO_3^{2-}$ groups; and wherein $R^7$, $R^{14}$, $R^{18}$ are independently selected from the group consisting of unsaturated monovalent radicals and epoxy group containing radicals and are substantially free from ionic moieties; and where subscript n and superscript y are independently from 1 to 6 and x is the product of n times y, where the subscript a, b, c, d, e, f, g, h, i, j are zero or positive subject to the following provisos: the sum a+b+c+d+e+f+g+h+i+j is greater than or equal to 2 and less than or equal to 6000, d+e+f is at least 1, a+d+g is greater than zero, b+e+h is greater than zero, c+f+i is greater than zero and a+b+c is greater than zero, wherein the composition includes the divalent hydrocarbonoxy group of A in formula (II), which is $(CHR^{20})_m$—$(OCHR^{20}CH_2)_p$—$(CH_2)_l$—, where l has a value of from 0 to 20, m has a value of 0 to 50 and p has a value from 1 to 50.

5. The composition of claim 1 wherein, in formula (II) M is a cation independently selected from Li, Na, K, Cs, Mg, Ca, Ba, Zn, Cu, Fe, Ni, Ga, Al, Mn, Cr, Ag, Au, Pt, Pd, Pb, Sb, Ru, Sn, Ce, Co, La, Eu, Gd and Rh.

6. A composition comprising an actinic radiation curable or thermally curable polyorganosiloxane ionomer having the general formula:

$$M^1{}_a M^2{}_b M^3{}_c D^1{}_d D^2{}_e D^3{}_f T^1{}_g T^2{}_h T^3{}_i Q_j \tag{I}$$

wherein:

$M^1 = R^1 R^2 R^3 SiO_{1/2}$ $M^2 = R^4 R^5 R^6 SiO_{1/2}$ $M^3 = R^7 R^8 R^9 SiO_{1/2}$ $D^1 = R^{10} R^{11} SiO_{2/2}$ $D^2 = R^{12} R^{13} SiO_{2/2}$ $D^3 = R^{14} R^{15} SiO_{2/2}$ $T^1 = R^{16} SiO_{3/2}$ $T^2 = R^{17} SiO_{3/2}$ $T^3 = R^{18} SiO_{3/2}$ $Q = SiO_{4/2}$ wherein $R^1$, $R^2$, $R^5$, $R^6$, $R^8$, $R^9$, $R^{11}$, $R^{13}$, $R^{15}$ are aliphatic, aromatic or fluoro monovalent hydrocarbon having from 1 to 60 carbon atoms, wherein $R^3$, $R^{10}$, $R^{16}$ are independently selected from —$CH_2CH(R')(C_nH_2n)$—O—$(C_2H_4O)_o$—$(C_3H_6O)_p$—$(C_4H_8O)_q$—R', wherein subscript n is zero or positive and has a value in the range of 0 to 6, subscripts o, p and q are zero or positive and independently selected from a value in the range of 0 to 100, subject to the limitation that the sum of o+p+q is greater than or equal to 1, R' is hydrogen or an aliphatic, aromatic or fluoro hydrocarbon having from 1 to 60 carbon atoms, wherein $R^4$, $R^{12}$, $R^{17}$ are selected from (i) or (ii):

(i) monovalent radical-bearing ion-pairs, substantially free of free radical polymerizable moieties, and having the formula (II)

$$A\text{-}X^{x-}M_n^{y+} \tag{II};$$

where A is a spacing group selected from a divalent hydrocarbon or hydrocarbonoxy group, where I is an ionic group selected from the group consisting of sulfonate —$SO_3^-$, sulfate —$OSO_3^-$, carboxylate —$COO^-$, phosphonate —$PO_3^{2-}$ and phosphate —$OPO_3^{2-}$ groups, where M is hydrogen or a cation independently selected from alkali metals, alkaline earth metals, transition metals, metals, metal complexes, quaternary ammonium groups, phosphonium groups, hydrocarbon cations, alkyl cations, organic cations, and cationic polymers, (ii) zwitterions having the formula (III):

$$\text{—R'—NR'''}_2^+\text{—R'''-I} \tag{III}$$

where R' is a divalent hydrocarbon radical containing from 1 to about 60 carbon atoms, R'' is a monovalent hydrocarbon radical containing from 1 to about 60 carbon atoms, and where R''' is divalent hydrocarbon radical containing from 2 to about 20 carbon atoms, and, I is an ionic group selected from the group consisting of sulfonate —$SO_3^-$, sulfate —$OSO_3^-$, carboxylate —$COO^-$, phosphonate —$PO_3^{2-}$ and phosphate —$OPO_3^{2-}$ groups; and wherein $R^7$, $R^{14}$, $R^{18}$ are independently selected from the group consisting of unsaturated monovalent radicals and epoxy group containing radicals and are substantially free from ionic moieties; and where subscript n and superscript y are independently from 1 to 6 and x is the product of n times y, where the subscript a, b, c, d, e, f, g, h, i, j are zero or positive subject to the following provisos: the sum a+b+c+d+e+f+g+h+i+j is greater than or equal to 2 and less than or equal to 6000, d+e+f is at least 1, a+d+g is greater than zero, b+e+h is greater than zero, c+f+i is greater than zero and a+b+c is greater than zero, wherein the composition includes the formula (II) wherein M is an organic cation selected from the group consisting of chlorhexidine, biguanide, quaternary ammonium compounds, quarternary phosphonium compounds, chitosan, chitosan derivatives and antimicrobial peptides selected from the group consisting of nisin, pediocin, gomesin, pleuricidin, their derivatives and recombinant forms.

7. The composition of claim 1 wherein $R^7$, $R^{14}$, $R^{18}$ are curable functional groups independently selected from the group consisting of the following general formula (IV), (V), (VI) and (VII):

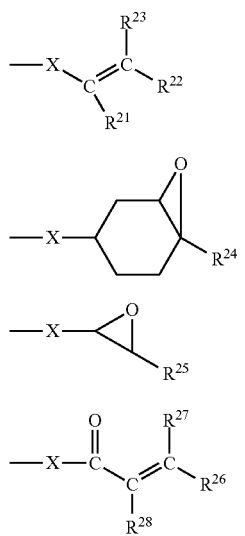

wherein $R^{21}$ to $R^{28}$ are independently selected from hydrogen, aliphatic/aromatic monovalent hydrocarbon having from 1 to 60 carbon atoms, where X is a divalent hydrocarbon linkage consisting of 1 to 60 carbon atoms and 0 to 20 heteroatoms selected from the group consisting of oxygen, nitrogen and sulfur.

8. The composition of claim 7 wherein $R^7$, $R^{14}$, $R^{18}$ are curable functional groups independently selected from monovalent radicals containing the group of the general formulae (IV) or (VII):

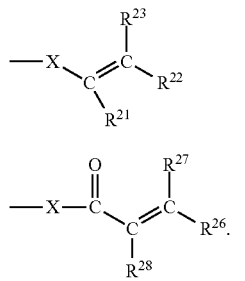

9. The composition of claim 8 further comprising a thermal or photo initiator.

10. The composition of claim 9 wherein the initiator comprises 0.001-50 parts by weight photoinitiators selected from the group consisting of benzoin, benzoin methyl ether, benzoin ethyl ether, benzoin propyl ether, benzoin-n-butyl ether, benzoin isobutyl ether, acetoin, butyroin, toluoin, benzil, benzophenone, para methoxybenzophenone, 2,2-diethoxyacetophenone, alpha-alpha-dimethoxy-alpha-phenyl acetophenone, methylphenyl glyoxylate, ethyphenyl glyoxylate, 4,4'-bis-(dimethylaminobenzophenone), propiophenone, acetophenone, 1-hydroxycyclohexyl phenyl ketone, 2,2-diethoxyacetophenone, ethlphenylpyloxylate, phenanthraquinone, and 2-hydroxy-2-methyl-1-phenyl-propan-1-one, tetramethylthiuram monosulfide, tetramethylthiuram disulfide, azobisisobutyronitrile, azobis-2,4-dimethylvaleronitrile, benzoyl peroxide, di-tert-butyl peroxide, 7-chlorothioxanthone, 2,4-diethylthioxanthone, 2,4-diisopropylthioxanthone, acylophosphine oxide photoinitiators and combinations thereof.

11. The composition of claim 8 optionally comprising a photosensitizer, selected from benzoin methyl ether or benzophenone/dimethyl ethanol amine.

12. The composition of claim 8 including 0 to 99 parts by weight acrylate derivatives selected from the group consisting of methylacrylate, butylacrylate, propylacrylate, N,N-dimethylacrylamide, methacrylic acid, N-isopropyl acrylamide, 2-hydroxy-ethyl-methacrylate (HEMA) and methacrylic acid, 3-[tris(trimethylsiloxy)silyl]propyl methacrylate, acrylate and methacrylate functional carbosilane molecules, hexafunctional urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated trimethylolpropane triacrylate, butanediol diacrylate, tripropylene glycol diacrylate, trimethylolpropane trimethacrylate, oligofunctional urethane acrylates, tetraacrylate monomer, polyester acrylate oligomers, and combinations thereof.

13. The composition of claim 8 comprising 0 to 99 parts by weight of an unsaturated olefin reactive component.

14. The composition of claim 13 further including an initiator to facilitate reaction between the silicone ionomer and the unsaturated olefin reactive component.

15. The composition of claim 14 wherein the initiator is selected from the group consisting of benzoin, benzoin methyl ether, benzoin ethyl ether, benzoin propyl ether, benzoin-n-butyl ether, benzoin isobutyl ether, acetoin, butyroin, toluoin, benzil, benzophenone, para methoxybenzophenone, 2,2-diethoxyacetophenone, alpha-alpha-dimethoxy-alpha-phenylacetophenone, methylphenyl glyoxylate, ethyphenyl glyoxylate, 4,4'-bis-(dimethylaminobenzophenone), propiophenone, acetophenone, 1-hydroxycyclohexyl phenyl ketone, 2,2-diethoxyacetophenone, ethlphenylpyloxylate, phenanthraquinone, and 2-hydroxy-2-methyl-1-phenyl-propan-1-one; sulfur compounds; azo compounds, organic peroxide compounds, thioxanthone photoinitiators and acylophosphine oxide photoinitiators.

16. The composition of claim 7 comprising a thiol-containing compound.

17. The composition of claim 13 wherein $R^7$, $R^{14}$, $R^{18}$ are curable functional groups independently selected from the group of the general formula

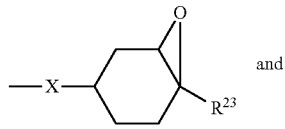

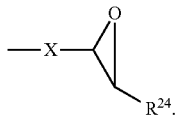 (IV)

18. The composition of claim 16 further including 0.001-50 parts by weight of a cationic photoinitiator.

19. The composition of claim 18 wherein the cationic photoinitiator is selected from the group consisting of diaryliodonium salts, triarylsulfonium salts, triarylselenonium salts, tetraarylphosphonium salts and aryldiazonium salts, respectively represented by the formulas $R^{29}{}_2I^+Y^-$, $R^{29}{}_3S^+Y^-$, $R^{29}{}_3Se^+Y^-$, $R^{29}{}_4P^+Y^-$ and $R^{29}{}_4N^+Y^-$ wherein, $R^{29}$ represents an aryl group, and $Y^-$ represents an anion selected from $SbF_6{}^-$, $AsF_6{}^-$, $PF_6{}^-$, $HSO_4{}^-$ and $ClO_4{}^-$.

20. The composition of claim 16 further including one or more of fluorinated alcohols, polyols, acrylates, epoxies, or vinyl ethers.

21. The composition of claim 20 including a fluorinated aliphatic alcohol having from 1 to about 10 carbon atoms.

22. A free radical polymerized composition derived from the organosiloxane composition of claim 1.

23. The composition of claim 22 wherein said composition is an emulsion.

24. The composition of claim 23 comprises monomers, prepolymers, crosslinkers, initiators, surfactants, co-surfactants, rheology modifiers, solvents, co-solvents and at least one phase immiscible with the said organosiloxane composition of claim 1.

25. The composition of claim 24 wherein immiscible phase is an aqueous phase.

26. The composition of claim 23 wherein the emulsion is a micro-emulsion.

27. The composition of claim 23 wherein the emulsion is a mini-emulsion.

28. The composition of claim 23 wherein the emulsion is a ternary emulsion.

29. A solution or bulk polymerized composition derived from the organosiloxane composition of claim 1.

30. The composition of claim 29 comprising monomers, prepolymers, crosslinkers, initiators, surfactants, co-surfactants, rheology modifiers, solvents and co-solvents.

31. A pressure sensitive adhesive prepared from the composition of claim 22.

32. A pressure sensitive adhesive prepared from the composition of claim 29.

33. A translucent, water-absorbing film prepared from the compositions of claim 22.

34. A translucent water-absorbing film prepared from the composition of claim 29.

35. A hydrogel prepared from the compositions of claim 22.

36. A hydrogel prepared from the composition of claim 29.

37. A contact lens made from the hydrogel of claim 35.

38. A contact lens made from the hydrogel of claim 36.

39. A coating composition prepared from the composition of claim 22.

40. A coating composition prepared from the composition of claim 29.

41. A silicone rubber composition comprising the organosiloxane composition of claim 1.

42. A product comprising the composition of claim 1 and further including one or more component selected from the group consisting of fillers, UV absorbers, UV stabilizers, cure accelerators, pigments, dyes, antimicrobial agents, biocides, surfactants, conductive fillers, non-reinforcing fillers, plasticizers, tackifiers, mold release agents, adhesion promoters, compatibilizers, pharmaceutical excipients, surfactants, antistatic agents, solvents, flattening agents and thixotropic agents.

43. A product comprising the organosiloxane composition of claim 1 wherein the product is selected from the group consisting of elastomers, gels, healthcare product, personal care product, household product apparel, sporting goods, paints, coatings, oil and gas, adhesives, pressure sensitive adhesives, waterborne coatings and adhesives, sealants, fuel cell, electronic and electrical products, agricultural compositions, textile treating compositions, membranes, injection moldable and compression moldable rubbers and plastics, and various silicone based rubbers, aerospace product, construction product, production of domestic appliances, machine and instrument apparatus and consumer goods.

* * * * *